(12) United States Patent
Lin

(10) Patent No.: US 6,679,416 B2
(45) Date of Patent: Jan. 20, 2004

(54) MULTI-FUNCTIONAL WELDING PLATFORM

(76) Inventor: Hao Fong Lin, 4F, 416, Sec. 4, Chung Yung N. Road, Peitou (TW)

( * ) Notice: Subject to any disclaimer, the term of this patent is extended or adjusted under 35 U.S.C. 154(b) by 99 days.

(21) Appl. No.: 10/066,601

(22) Filed: Feb. 6, 2002

(65) Prior Publication Data

US 2003/0111509 A1 Jun. 19, 2003

(30) Foreign Application Priority Data

Dec. 13, 2001 (TW) ........................................ 90221782 U

(51) Int. Cl.⁷ ...................... B23K 37/00; B01D 50/00; F23J 11/08
(52) U.S. Cl. ...................... 228/57; 228/47.1; 96/223; 55/DIG. 18; 55/385.1; 454/63
(58) Field of Search ........................ 55/385.1, DIG. 18; 454/49–55, 63–67; 96/15, 223

(56) References Cited

U.S. PATENT DOCUMENTS

| | | | | |
|---|---|---|---|---|
| 3,926,104 A | * | 12/1975 | El Dorado | 454/65 |
| 4,868,369 A | * | 9/1989 | Chen | 219/242 |
| 4,898,089 A | * | 2/1990 | Roos | 454/49 |
| 5,047,348 A | * | 9/1991 | Stinson | 435/300.1 |
| 5,511,764 A | * | 4/1996 | Wonsetler | 266/49 |
| 5,569,074 A | * | 10/1996 | Gressel | 454/56 |
| 5,807,414 A | * | 9/1998 | Schaefer | 55/385.2 |
| 6,517,594 B2 | * | 2/2003 | Olander et al. | 55/385.2 |
| 2002/0152731 A1 | * | 10/2002 | Reich et al. | 55/385.1 |

* cited by examiner

*Primary Examiner*—M. Alexandra Elve
*Assistant Examiner*—Kevin L McHenry
(74) *Attorney, Agent, or Firm*—Troxell Law Office PLLC

(57) ABSTRACT

A multi-functional welding platform is disclosed. The multi-functional welding platform has a box body at a base thereof. The rear side thereof is installed with a power input end, a power regulator, a high voltage discharging plate, a power output end, etc. A lower side of the platform is installed with an air inlet space. A rear side of the space has a fan. A plurality of air inlet holes are distributed on the platform and filtering material is placed therein. Other than providing the general device for welding, harmful gas or metal smoke enters into the air inlet holes on the platform and then is filtered and then exhausted from the fan so that the operators will not breath harmful gas.

3 Claims, 5 Drawing Sheets

MULTI-FUNCTIONAL WELDING PLATFORM

BACKGROUND OF THE INVENTION

1. Field of the Invention

The present invention relates to welding devices, and particularly to a multi-functional welding platform, which has a box body at a base thereof. The rear side of the platform is installed with a power input end, a power regulator, a high voltage discharging plate, a power output end, etc. A lower side of the platform is installed with an air inlet space. A rear side of the space has a fan. A plurality of air inlet holes are distributed on the platform and filtering material is placed therein.

2. Description of Related Art

Welding work must be performed in the assembly of electronic parts. However, in the process of welding, it is general that harmful gas or metal smoke will be breathed by the operators and thus the operator suffers from injuries from that work.

The harmful gas or metal smoke has a great threat to the human body, for example, it will harm the lungs and respirators. From a statistic data, it is known that in most conditions, the harmful gas and metal smoke in the working places are over the allowable values. Therefore, the effective method for preventing the operators from injury is to prevent the operator from breathing the gas and smoke.

In general, the way for preventing from breathing harmful gas is to wear a mouth mask on the mouth or a face mask or to use a collector, as illustrated in FIG. 2, for examples, fixed type partial exhausting devices and adjustable breathing devices. However, these ways are inconvenient and the effect is not preferred. Moreover, the costs of the fixed type partial exhausting devices and adjustable breathing devices are high and are easily effected by wind flow. Therefore, these prior ways are not suitable devices to improve the defects in the prior art.

SUMMARY OF THE INVENTION

A multi-functional welding platform is disclosed. The multi-functional welding platform has a box body at a base thereof. The rear side thereof is installed with a power input end, a power regulator, a high voltage discharging plate, a power output end, etc. A lower side of the platform is installed with an air inlet space. A rear side of the space has a fan. A plurality of air inlet holes are distributed on the platform and filtering material is placed therein. Other than providing the general device for welding, harmful gas or metal smoke enters into the air inlet holes on the platform and then is filtered and then exhausted from the fan so that the operators will not breath harmful gas.

The various objects and advantages of the present invention will be more readily understood from the following detailed description when read in conjunction with the appended drawing.

DETAILED DESCRIPTION OF THE PREFERRED EMBODIMENTS

Figure 1:
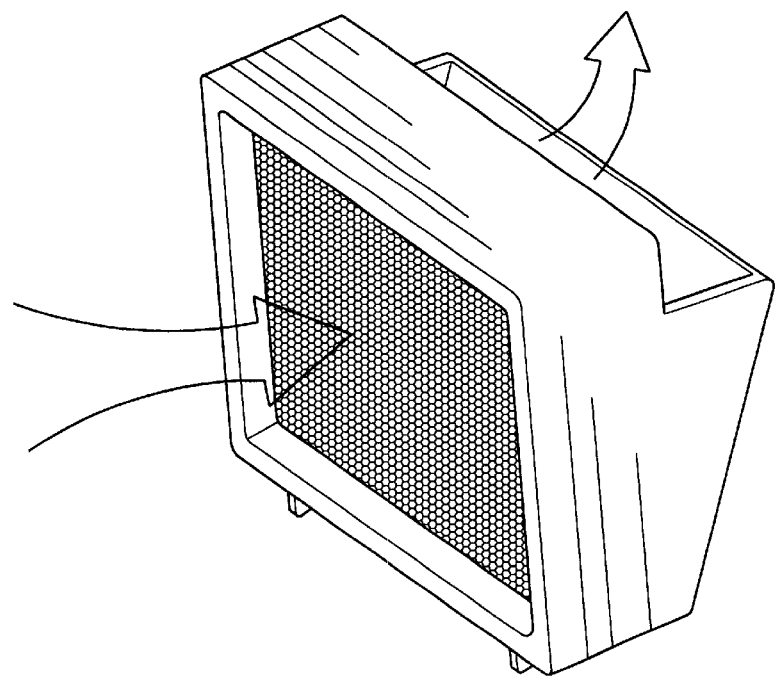
FIG. 1 shows a conventional fixed type gas exhausting device.
Figure 2:
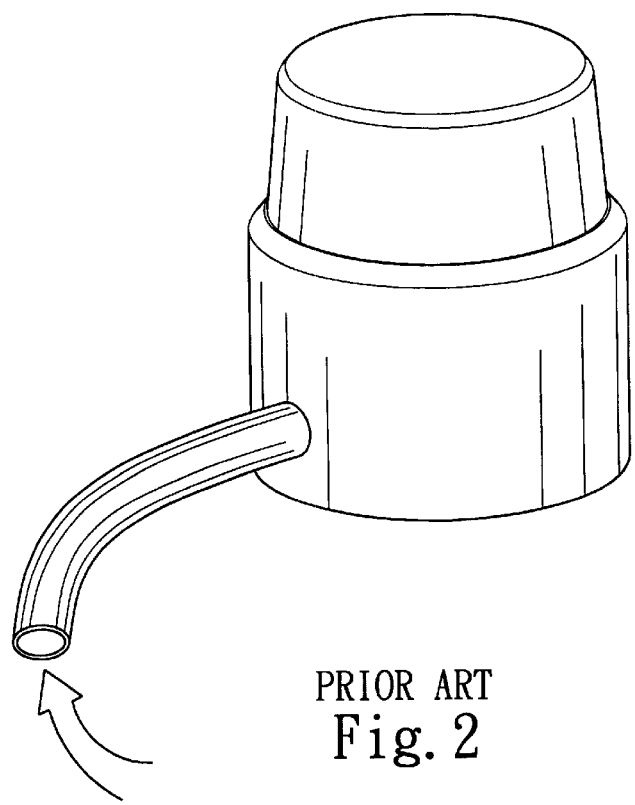
FIG. 2 is a perspective view showing a conventional adjustable gas sucking device.
Figure 3:
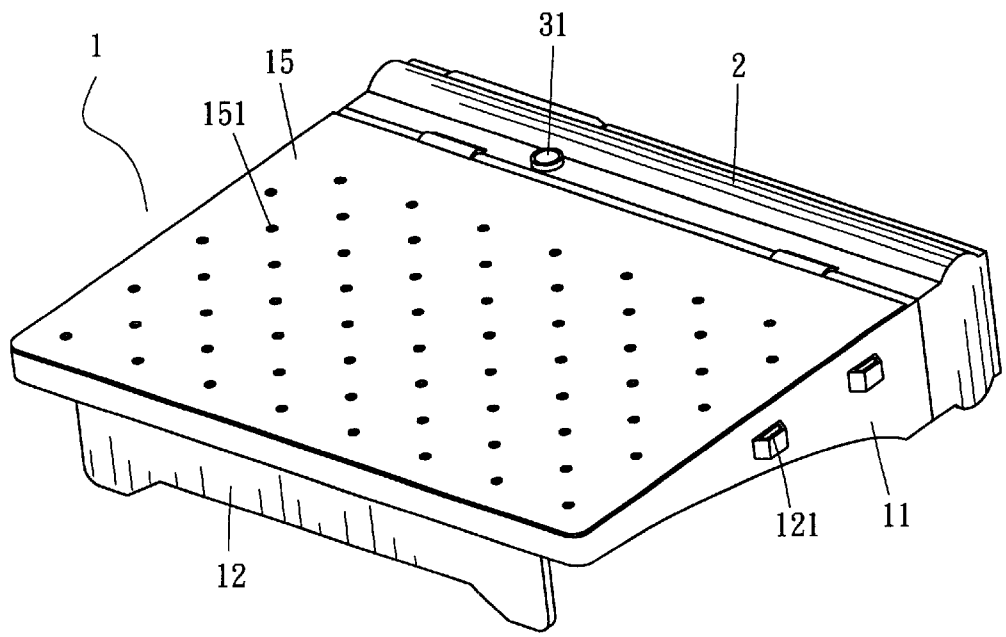
FIG. 3 is a front perspective view of the multi-functional welding platform of the present invention.
Figure 4:
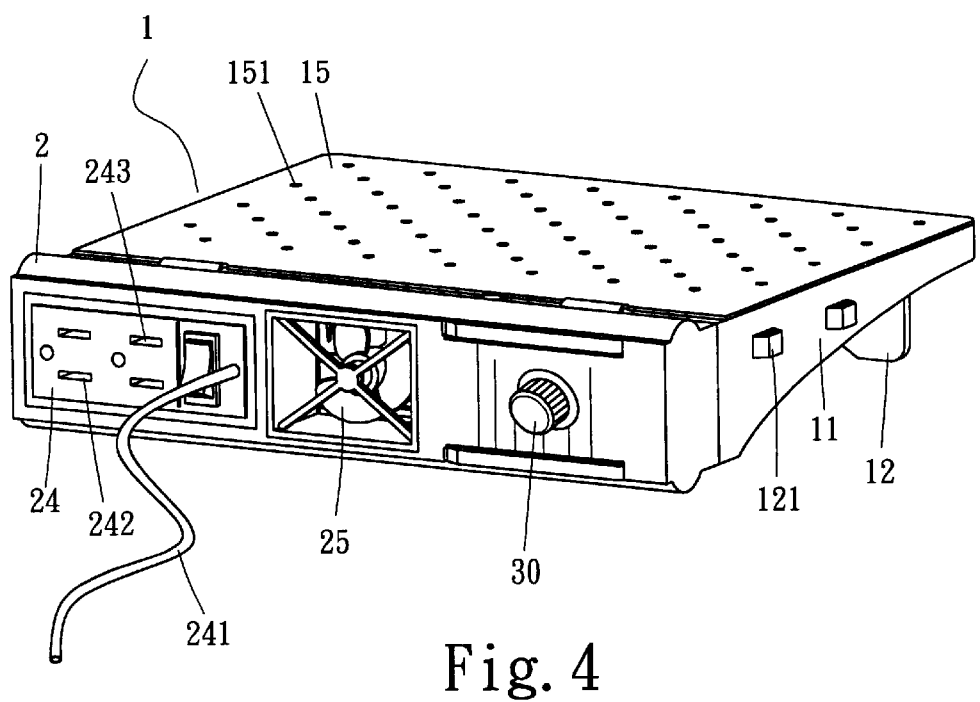
FIG. 4 is a rear perspective view of the multi-functional welding platform of the present invention.
Figure 5:
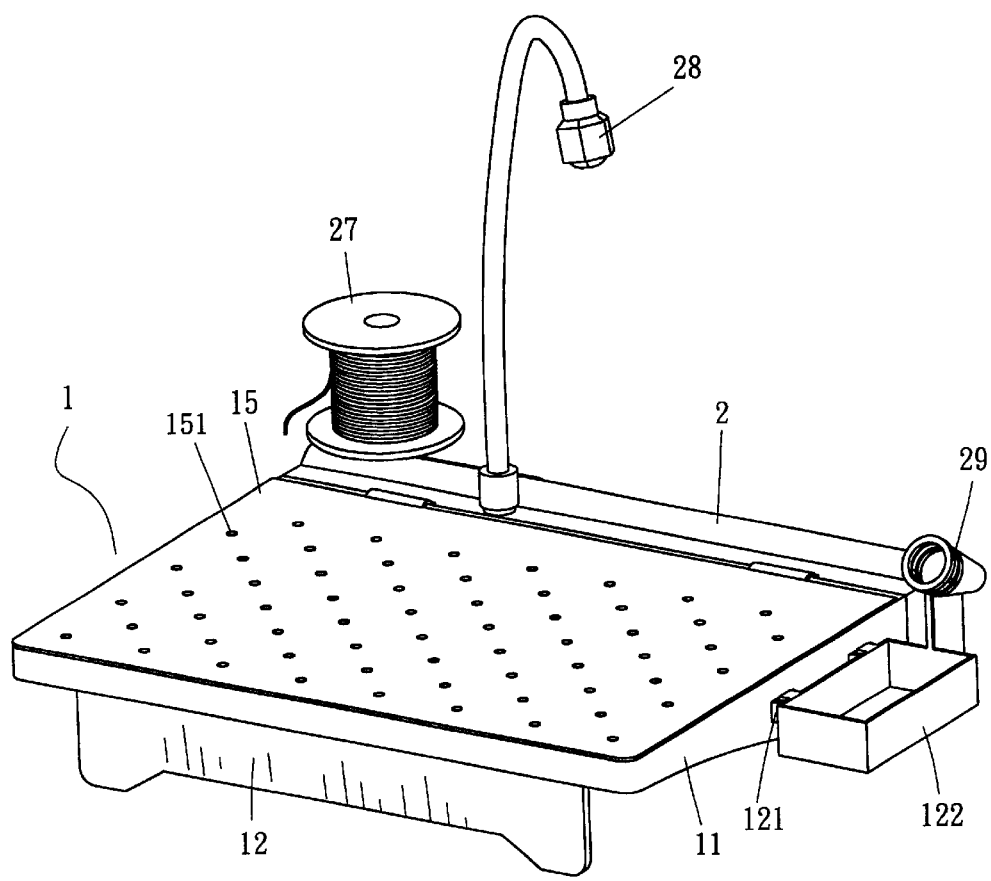
FIG. 5 is a perspective view showing one embodiment of the multi-functional welding platform of the present invention.
Figure 6:
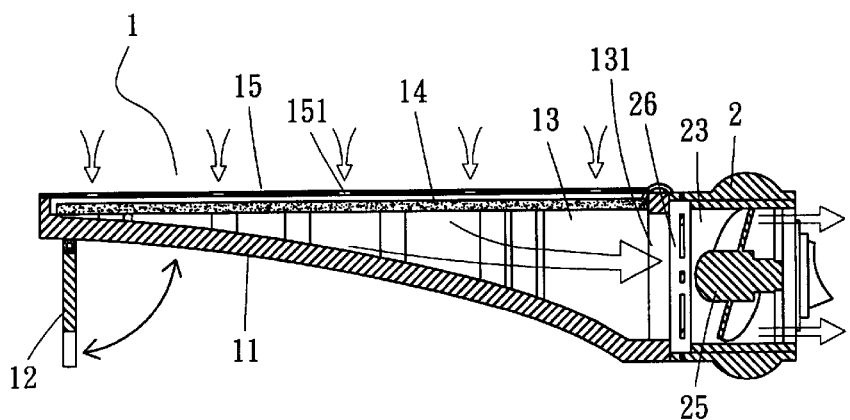
FIG. 6 is the cross section view of the multi-functional welding platform of the present invention.
Figure 7:
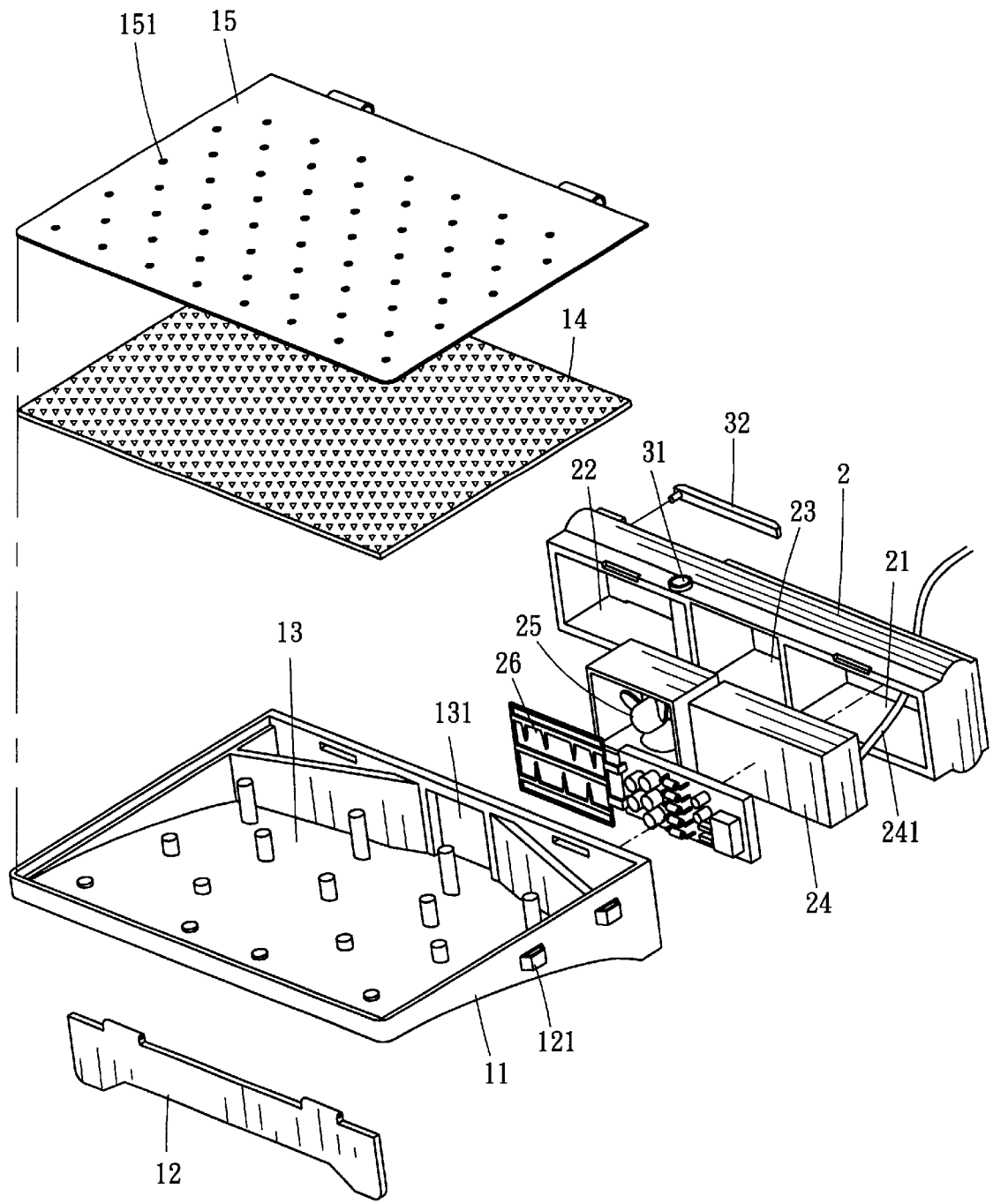
FIG. 7 is an exploded perspective view of the multi-functional welding platform of the present invention.

Referring to FIGS. 3 to 7, the multi-functional welding platform 1 of the present invention. The multi-functional welding platform has a box body 11. A front edge of the box body 11 has a rotationable supporting pad 12. The lateral sides of the box body 11 has buckling grooves 121 so that a parts box 122 can be buckled to the box body 11. A lower side of the box body 11 is formed with an air inlet space 13. A rear side of the air inlet space 13 is formed with a ventilation channel 131. The upper side of the air inlet space may be placed with filtering materials 14. A plurality of air inlet holes 151 are uniformly distributed on a working panel 15.

A rear side of the box body 11 can be assembled with a components box 2. The components box 2 has grooves 21, 22 and an air hole 23. A power regulator 24 with a power input wire 241 and a power output socket 242 can be placed in the groove 21. The power regulator 24 has a control circuit for adjusting power output. The output power of a power adjustable output socket 243 can be controlled by a power adjusting button 30.

A fan 25 can be located in the air hole 23. A high voltage discharging plate 26 is installed in front of the fan 25. The components box 2 can be installed with a movable tin box retaining post 32 for placing tin box 27 and a buckling groove 121 for placing tin injecting gun or iron frame 29. A fixing hole seat 31 is installed on the components box 2 for providing illuminators 28 or lens, clamping device, and other retaining devices.

Figure 8:
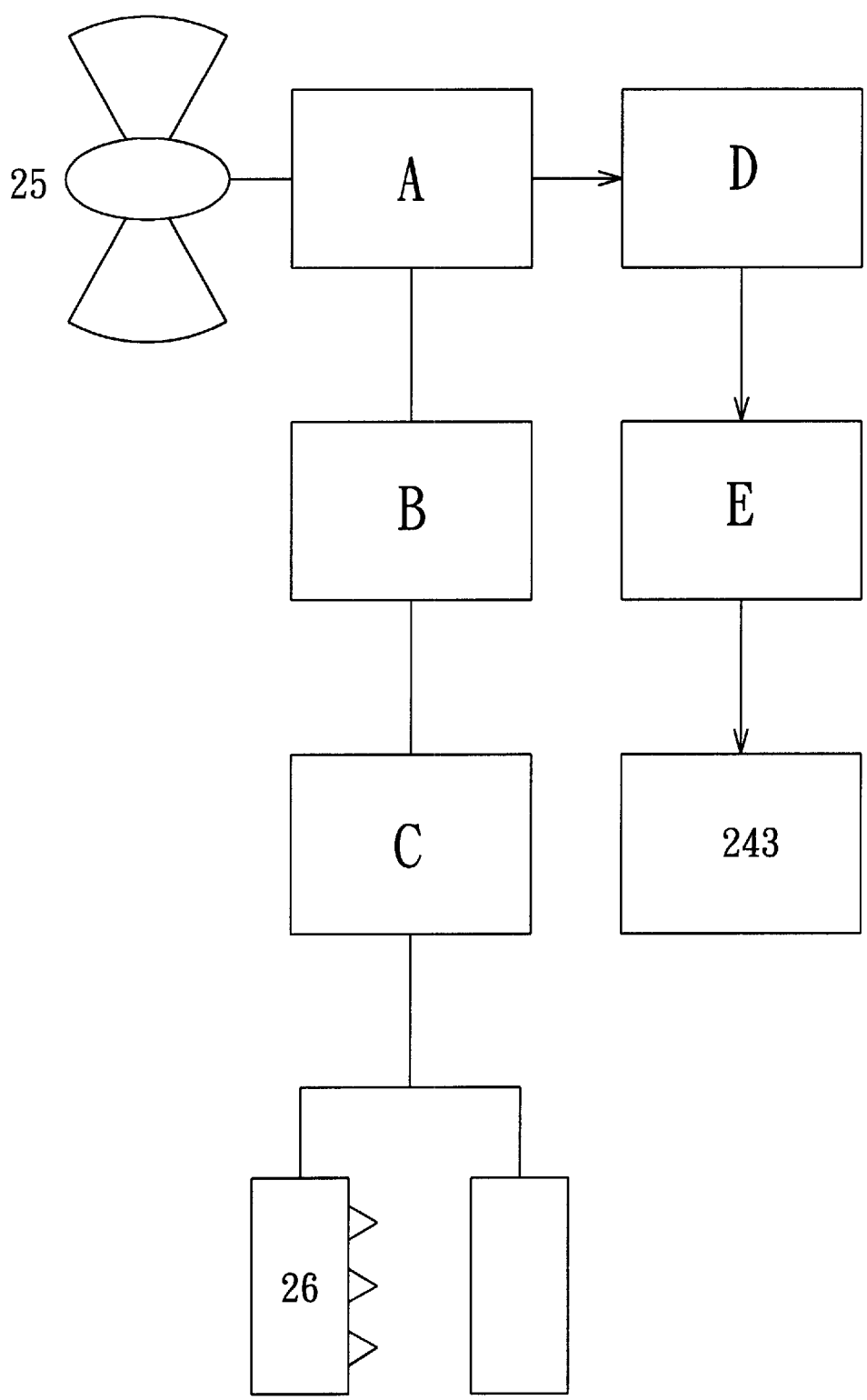
FIG. 8 is a simple block diagram showing the circuit of the multi-functional welding platform of the present invention.

The working block diagram of the multi-functional welding platform of the present invention is illustrated in FIG. 8. After power is inputted, the power is stabilized by the power regulating circuit A of the power regulator 24. The power is then supplied to the fan 25 and then to the high voltage discharging plate 26 through a high frequency oscillating circuit B and a voltage regulator circuit C.

Furthermore, the power regulating circuit A provides power to an AC phase trigger adjusting circuit D. The output phase is adjusted and controlled by the power adjusting button 30. Then, the power output circuit E outputs triggered output power to a power adjustable output socket 243. The welding irons may acquire power from this socket.

Thereby, the present invention provides a multi-functional welding platform for using in a simple welding work. When the welding work is performed. The fan 25 will be actuated so that harmful gas or metal smoke generated on the working panel 15 of the multi-functional welding platform can be absorbed by the air inlet holes 151 into the filtering material 14 and then enter into the air inlet space 13. Then the gas passes through the high voltage discharging plate 26 from the rear ventilation channel 131 for killing bacteria. Finally, the gas is exhausted from the air holes 23 of the fan 25. Other than providing the general device for welding, the present invention will cause the harmful gas or metal smoke can enter into the air inlet holes on the platform and then is filtered and then exhausted from the fan so that the operators will not breath harmful gas.

What is claimed is:

1. A multi-functional welding platform comprising a box body; a front edge of the box body having a rotationable supporting pad; lateral sides of the box body having buckling grooves so that a parts box is buckled to the box body; a lower side of the box body is formed with an air inlet space; a rear side of the air inlet space is formed with a ventilation channel; an upper side of the air inlet space is placed with filtering materials; a plurality of air inlet holes are uniformly distributed on a working panel;

a rear side of the box body being assembled with a components box; the components box having grooves and a air holes; a power regulator with a power input wire and a power output socket and circuits of the working platform are placed in the groove; a fan is located in the air hole; a high voltage discharging plate is installed in front of the fan; characterized in that:

when the welding work is performed; the fan will be actuated so that harmful gas or metal smoke generated on the working panel of the multi-functional welding platform is absorbed by the air inlet holes on the working panel and into filtering material and then enter into the air inlet space; then the gas passes through the high voltage discharging plate from the ventilation channel for killing bacteria; finally, the gas is exhausted from the air holes of the fan; other than providing the general device for welding, harmful gas or metal smoke enters into the air inlet holes on the platform and then is filtered and then exhausted from the fan so that the operators will not breath harmful gas.

2. The multi-functional welding platform as claim in claim 1, wherein the components box provides illuminators or lens, clamping device, or other retaining devices.

3. The multi-functional welding platform as claim in claim 1, wherein the multi-functional welding platform has a high voltage discharging circuit which is formed by a high frequency oscillating circuit and a high voltage discharging plate and a control circuit which adjusts an A. C. phase triggering angle.

* * * * *